(12) United States Patent
Nakamura et al.

(10) Patent No.: US 11,920,951 B2
(45) Date of Patent: Mar. 5, 2024

(54) PHOTOELECTRIC SENSOR AND METHOD FOR MANUFACTURING SAME

(71) Applicant: OMRON Corporation, Kyoto (JP)

(72) Inventors: Jumpei Nakamura, Kyoto (JP); Hirotaka Nakashima, Fukuchiyama (JP); Kazunari Komai, Kameoka (JP); Takahiro Oikawa, Kameoka (JP)

(73) Assignee: OMRON Corporation, Kyoto (JP)

( * ) Notice: Subject to any disclaimer, the term of this patent is extended or adjusted under 35 U.S.C. 154(b) by 337 days.

(21) Appl. No.: 17/424,886

(22) PCT Filed: Feb. 28, 2020

(86) PCT No.: PCT/JP2020/008345
§ 371 (c)(1),
(2) Date: Jul. 22, 2021

(87) PCT Pub. No.: WO2020/175676
PCT Pub. Date: Sep. 3, 2020

(65) Prior Publication Data
US 2022/0082380 A1 Mar. 17, 2022

(30) Foreign Application Priority Data
Feb. 28, 2019 (JP) ................. 2019-036501

(51) Int. Cl.
*G01C 3/02* (2006.01)
*G02B 1/18* (2015.01)

(52) U.S. Cl.
CPC ........ *G01C 3/02* (2013.01); *G02B 1/18* (2015.01)

(58) Field of Classification Search
CPC ............ G02B 27/0006; G02B 19/0085; G02B 19/0052; G02B 1/18; G01C 3/02; G01D 11/26; C09D 5/16; G01V 8/12
See application file for complete search history.

(56) References Cited

U.S. PATENT DOCUMENTS 5,879,626 A * 3/1999 Watterson .......... G02B 27/0006
422/62
6,337,129 B1 1/2002 Watanabe et al.
(Continued)

FOREIGN PATENT DOCUMENTS

JP S6410940 1/1989
JP 2007305673 11/2007
(Continued)

OTHER PUBLICATIONS

Kamogawa Tadashi "Monitoring Apparatus and Monitoring Method", Feb. 9, 2006, JP2006041779A (Year: 2006).*
(Continued)

*Primary Examiner* — Sang H Nguyen
(74) *Attorney, Agent, or Firm* — JCIPRNET (57) ABSTRACT

Provided is a photoelectric sensor capable of being securely joined to a housing while being sufficiently resistant to dirt. A housing 12 of a photoelectric sensor 10 has an opening 121 which allows passage of at least one of light from a light projecting unit 14 and light to a light receiving unit 16, and is provided with a cover lens 50 which covers the opening 121 and is optically transmissive. The cover lens 50 is joined to an edge portion 121a of the housing 12 defining the opening 121. An outer surface 51 of the cover lens 50 is provided with antifouling coating 61. An inner surface 52 of the cover lens 50 has a joint portion 52a which is in contact with the edge portion 121a and is not provided with the antifouling coating 61.

14 Claims, 9 Drawing Sheets

(56) References Cited

U.S. PATENT DOCUMENTS

| | | | |
|---|---|---|---|
| 2004/0061828 A1 | 4/2004 | Newman | |
| 2005/0099609 A1* | 5/2005 | Masuzawa | H04N 9/317 353/101 |
| 2007/0242134 A1* | 10/2007 | Zernov | B63G 8/001 348/81 |
| 2009/0301654 A1* | 12/2009 | Suzuki | B24B 9/146 428/137 |
| 2011/0073142 A1 | 3/2011 | Hattori et al. | |
| 2015/0036037 A1 | 2/2015 | Reed | |
| 2018/0259372 A1* | 9/2018 | Komai | G01B 11/26 |
| 2019/0056643 A1* | 2/2019 | Chang | H04N 23/55 |
| 2019/0101561 A1* | 4/2019 | Nakashima | G01S 17/02 |
| 2019/0289181 A1* | 9/2019 | Uetsuji | H04N 23/56 |

FOREIGN PATENT DOCUMENTS

| | | |
|---|---|---|
| JP | 2008298614 | 12/2008 |
| JP | 2016004208 | 1/2016 |
| JP | 2018152227 | 9/2018 |
| KR | 101708353 | 2/2017 |
| WO | 2015194200 | 12/2015 |

OTHER PUBLICATIONS

Suzuki et al "Method for Manufacturing Stain Proof Optical Article", Oct. 27, 2005, JP 2005301208A (Year: 2005).*

"Search Report of Europe Counterpart Application", dated Oct. 10, 2022, pp. 1-13.

"International Search Report (Form PCT/ISA/210) of PCT/JP2020/008345," dated May 26, 2020, with English translation thereof, pp. 1-4.

"Written Opinion of the International Searching Authority (Form PCT/ISA/237) of PCT/ JP2020/008345," dated May 26, 2020, with English translation thereof, pp. 1-6.

Office Action of Korea Counterpart Application, with English translation thereof, dated Jun. 26, 2023, pp. 1-12.

\* cited by examiner

PHOTOELECTRIC SENSOR AND METHOD FOR MANUFACTURING SAME

CROSS-REFERENCE TO RELATED APPLICATION

This application is a 371 application of the International PCT application serial no. PCT/JP2020/008345, filed on Feb. 28, 2020, which claims the priority benefits of Japan Patent Application No. 2019-036501, filed on Feb. 28, 2019. The entirety of each of the above-mentioned patent applications is hereby incorporated by reference herein and made a part of this specification.

BACKGROUND

Technical Field

The invention relates to a photoelectric sensor and a method for manufacturing the same.

Description of Related Art

A photoelectric sensor may be attached to a production line or equipment of a factory, for example, and used for detecting whether a workpiece is present.

The above-described photoelectric sensor generally has a light projecting unit that emits light and a light receiving unit that receives light housed inside a case (hereinafter, referred to as a housing). Further, in addition to a light projecting element constituting the light projecting unit and a light receiving element constituting the light receiving unit, a substrate on which electronic components constituting a signal processing unit are mounted is housed inside the housing. The housing has an optical opening for detection light emitted from the light projecting unit and return light received by the light receiving unit to pass through, and a cover or a lens with an integrated cover, which serves as an optical component, may be arranged in the opening. The cover lens functions as a light projecting lens through which the detection light passes and a light receiving lens through which the reflected light passes, or protection of those lenses. An example in which such a cover lens is arranged on the front surface side of the light projecting element or the light receiving element is described in Patent Document 1 below.

RELATED ART

Patent Document

[Patent Document 1] Japanese Laid-Open No. 2007-305673

SUMMARY

Problems to be Solved

When the photoelectric sensor is attached to the production line or equipment of a factory, the cover lens arranged on the front surface side of the light projecting element or the light receiving element may become dirty due to, for example, cleaning water, processing oil, dust, etc., and as a result, the amount of light transmitted through the cover lens may decrease, and the detection performance of the photoelectric sensor may drop.

Patent Document 1 describes that a surface of the cover lens is coated with a heat- or photo-crosslinkable resin composition, but it has a problem that it does not have a sufficient function against dirt caused by the above-mentioned cleaning water, processing oil, dust, etc. In order to solve such a problem, for example, an idea is to apply antifouling coating to the cover lens. However, in the case where a joining method, such as heating the interface between the cover lens and the housing to a high temperature by laser welding to melt and weld them, is performed, since the material constituting the antifouling coating has a high melting point, there is a problem that it is difficult to sufficiently melt the antifouling coating material and join it to the housing. In addition, in the case where a joining method, such as joining the interface between the cover lens and the housing using an adhesive, is performed, if the joining is performed with the antifouling coating exposed on the surface, since the material constituting the antifouling coating material generally contains a fluorine-based compound, there is a problem that the joinability between the cover lens and the housing using the adhesive may decrease as compared with a case where only the base material is used. When the photoelectric sensor is used in an environment contaminated by processing oil and dust, it is desirable to join the cover lens to the housing while preventing the cover lens from dirt.

Therefore, the invention is to provide a photoelectric sensor including a cover lens that can be securely joined to a housing while sufficiently preventing dirt.

Means for Solving the Problems

A photoelectric sensor according to one aspect of the invention is a photoelectric sensor housing at least one of a light projecting unit that emits light and a light receiving unit that receives light in a housing. The housing has an opening that allows at least one of light from the light projecting unit and light to the light receiving unit to pass through. A cover lens that covers the opening and transmits the light is provided. The cover lens is joined to an edge portion of the housing that defines the opening. An outer surface of the cover lens is applied with antifouling coating while a portion, which is in contact with the edge portion, of an inner surface of the cover lens is not applied with the antifouling coating.

According to this aspect, since the outer surface of the cover lens is applied with the antifouling coating, for example, when the photoelectric sensor is used in an environment contaminated by cleaning water, processing oil, dust, etc., dirt can still be sufficiently prevented. In addition, since the portion, which is in contact with the edge portion of the housing that defines the opening, of the inner surface of the cover lens is not applied with the antifouling coating, the portion and the edge portion of the housing can be securely joined by, for example, laser welding. As a result, it is possible to provide the photoelectric sensor including the cover lens that can be securely joined to the housing while sufficiently preventing dirt.

In the above aspect, a material constituting the antifouling coating may be a structure that is a one-layer structure in which a coating base material and a coating agent are chemically crosslinked.

In the above aspect, the portion, which is in contact with the edge portion, of the inner surface of the cover lens and the housing may be joined by laser welding. Further, the portion, which is in contact with the edge portion, of the inner surface of the cover lens and the housing may be joined by an adhesive.

According to the above aspect, the inner surface of the cover lens and the edge portion can be joined by laser welding or an adhesive without the antifouling coating. Since the material constituting the antifouling coating is generally a fluorine-based compound, it is possible to prevent the joining strength from being mechanically weakened as compared with the base material when joining with an adhesive.

In the above aspect, a mark may be printed on the inner surface of the cover lens. In addition, the mark may be provided at a position covering the light projecting unit of the cover lens when the cover lens is arranged inside out in the housing.

According to this aspect, the mark printed on the inner surface of the cover lens is provided at the position covering the light projecting unit of the cover lens when the cover lens is arranged inside out in the housing. Therefore, it can be easily determined whether the cover lens is arranged inside out in the housing.

Effects

According to the invention, it is possible to provide a photoelectric sensor including a cover lens that can be securely joined to a housing while sufficiently preventing dirt.

DESCRIPTION OF THE EMBODIMENTS

Embodiments of the invention will be described with reference to the accompanying drawings. For convenience of explanation, the front/rear, left/right, and top/bottom are based on those shown in FIG. 1. In each drawing, parts having the same reference numerals have the same or similar configurations.

Figure 1:
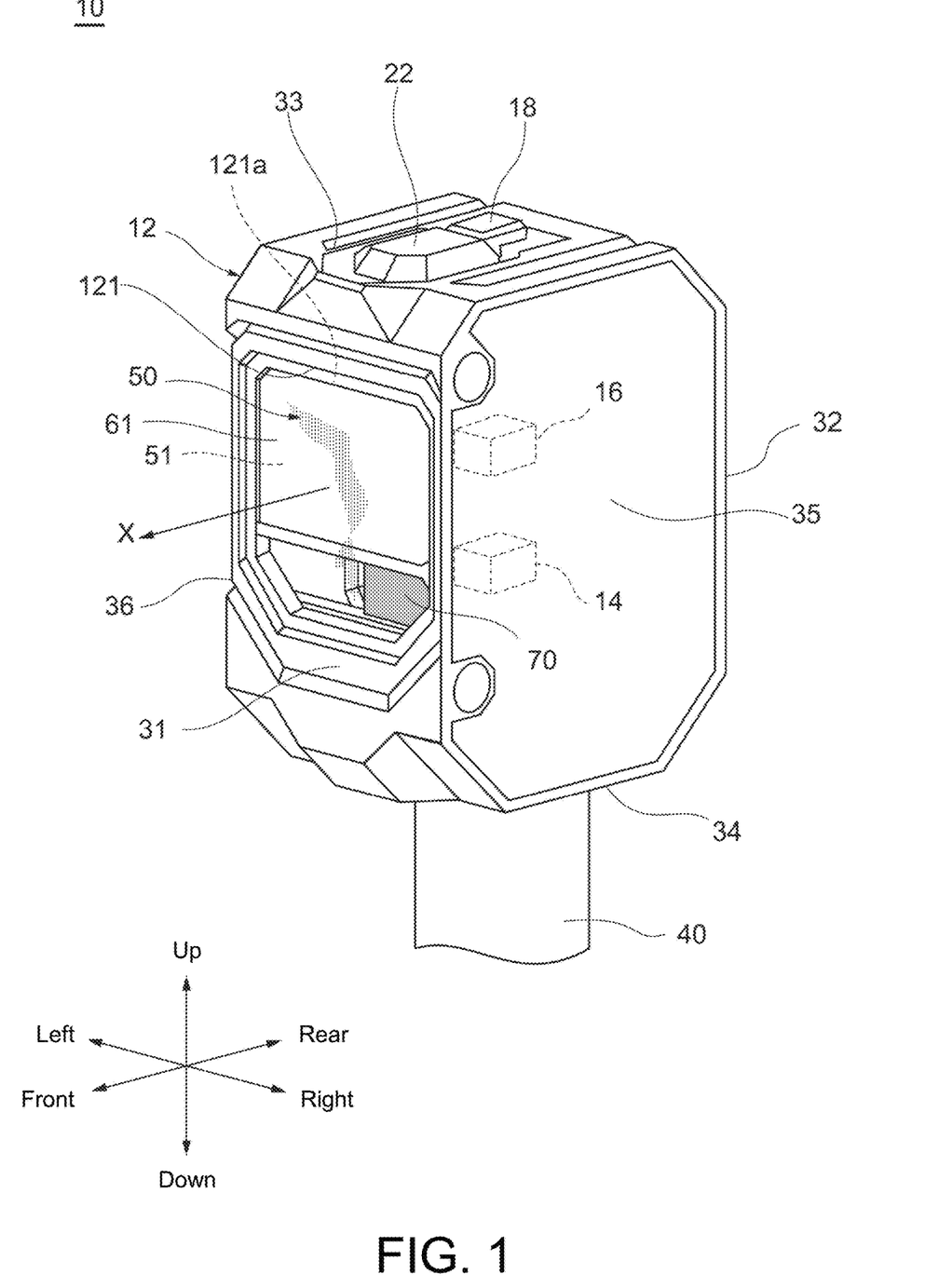
FIG. 1 is a perspective view of a photoelectric sensor according to an embodiment as viewed from one direction.

As shown in FIG. 1, a photoelectric sensor 10 includes a housing 12. A light projecting unit 14 and a light receiving unit 16 are housed inside the housing 12. The housing 12 has an opening 121 for the detection light emitted from the light projecting unit 14 and the return light received by the light receiving unit 16 to pass through, and a cover lens 50 is arranged in the opening 121. Further, for example, a teach button 18 and an indicator 22 are provided on the outer surface of the housing 12. In the following, an example in which the light projecting unit 14 and the light receiving unit 16 are housed in the housing 12 will be described as a premise, but the invention is not limited to the illustrated example, and in the present embodiment, at least one of the light projecting unit 14 and the light receiving unit 16 may be housed in the housing 12. That is, the sensor of the present embodiment also includes a form that the light projecting unit 14 and the light receiving unit 16 are housed in separate housings.

The light projecting unit 14 is a unit that projects light to an object to be detected, and has a light emitting element and a light projecting lens. The light emitting element is, for example, a laser diode, and an optical axis X thereof is parallel to the front-rear direction. The light receiving unit 16 is a unit that receives the reflected light of the light projected to the object to be detected, and has a light receiving element and a light receiving lens. The light receiving element is, for example, a two-split photodiode or a position detection element. The principle of TOF (Time of Flight) or triangular distance measurement, for example, can be used as the detection principle of distance measurement for determining the distance to the object to be detected. For example, when the principle of triangular distance measurement is used in the above configuration, the light emitted from the light emitting element is projected to the object to be detected through the light projecting lens, and the light reflected by the object to be detected forms an image on the light receiving element through the light receiving lens. The light receiving element outputs two light receiving signals according to the image formation position and transmits them to a control circuit via an amplifier. The amplifier and the control circuit are built in the photoelectric sensor 10, and in the control circuit, a position signal value calculated from the two light receiving signals received is compared with a threshold value to obtain the distance to the object to be detected.

The teach button 18 functions as a setting unit for changing the setting of the sensor body, and has, for example, a function of receiving an input operation from the outside to set the threshold value. Here, the threshold value refers to a reference value for determining whether the object to be detected is present or the distance to the object to be detected in the photoelectric sensor 10, and is one of the sensitivity parameters for adjusting the sensitivity. In addition to the threshold value, the sensitivity parameters include the power of the light emitted from the light projecting unit 14, that is, the light projecting intensity, and the amplification factor of the amount of light received by the light receiving unit 16, that is, the gain. For example, in the case where a transparent object to be detected has a low reflectance, a high light projecting intensity is set. When the user presses the teach button 18, a teaching process of setting the sensitivity parameters including at least the threshold value is performed, and the sensitivity parameters including at least the threshold value is automatically set to a certain value. The teaching process includes, for example, a one-point teaching process and a two-point teaching process, and since the contents thereof have been described in detail in past patent documents of the applicant (for example, Japanese Laid-Open No. 2008-298614), the description thereof is omitted here.

The indicator 22 lights up according to the power supply status and the detection status of the photoelectric sensor 10. For example, the indicator 22 has a power supply light that lights up when the power is turned on, and an operation indicator light that lights up when the object to be detected is detected. The power supply light and the operation indicator light each include, for example, an LED, and are lit up with different display colors.

The housing 12 is made of, for example, resin or metal, and has a substantially rectangular parallelepiped shape. The housing 12 has a front surface 31, a back surface 32, a top surface 33, a bottom surface 34, a side surface 35, and a side surface 36 with respect to the six surfaces constituting the rectangular parallelepiped. The front surface 31 and the back surface 32 face each other with the inside of the housing 12 interposed therebetween. Similarly, the top surface 33 and the bottom surface 34 face each other with the inside of the housing 12 interposed therebetween, and the side surface 35 and the side surface 36 face each other with the inside of the housing 12 interposed therebetween. The front surface 31 and the back surface 32 are formed to be longer in the top-bottom direction than in the left-right direction. Similarly, the top surface 33 and the bottom surface 34 are formed to be longer in the front-rear direction than in the left-right direction, and the side surfaces 35 and 36 are formed to be longer in the top-bottom direction than in the front-rear direction. The top surface 33 is adjacent to the front surface 31 and extends in a direction orthogonal to the front surface 31 and the back surface 32. The indicator 22 and the teach button 18 are provided on the top surface 33 in order from the side of the front surface 31.

A cable 40 is connected to the bottom surface 34 of the housing 12. The cable 40 is used, for example, to transmit a detection signal indicating a detection result of the photoelectric sensor 10 to the outside of the photoelectric sensor 10.

Inside the housing 12, a configuration usually provided as the photoelectric sensor (for example, a substrate mounted with a light projecting element, a light receiving element, a light projecting circuit (not shown) for driving the light projecting element, and a light receiving circuit (not shown) for electrically processing the light receiving signal of the light receiving element) is housed. The above-described cable 40 has a cable core wire (not shown) inside, and the cable core wire passes through the inside of the housing 12 and is connected to the above-described substrate arranged in the housing 12. The above-mentioned "substantially rectangular parallelepiped shape" regarding the housing 12 does not mean a rectangular parallelepiped having all internal corners at 90 degrees, and at least includes a shape formed by chamfering one corner of such a rectangular parallelepiped.

As shown in FIG. 1, the housing 12 is provided with the cover lens 50 (transparent acrylic cover lens) as an optical component in a manner of closing the opening 121 for light projecting and receiving. In other words, the photoelectric sensor 10 is provided with a window into which the cover lens 50 is fitted on the front surface of the housing 12. The cover lens 50 has a function of covering the opening 121 and transmitting light. The cover lens 50 is joined to an edge portion 121a (see FIG. 2) of the housing 12 that defines the opening 121.

Figure 2:
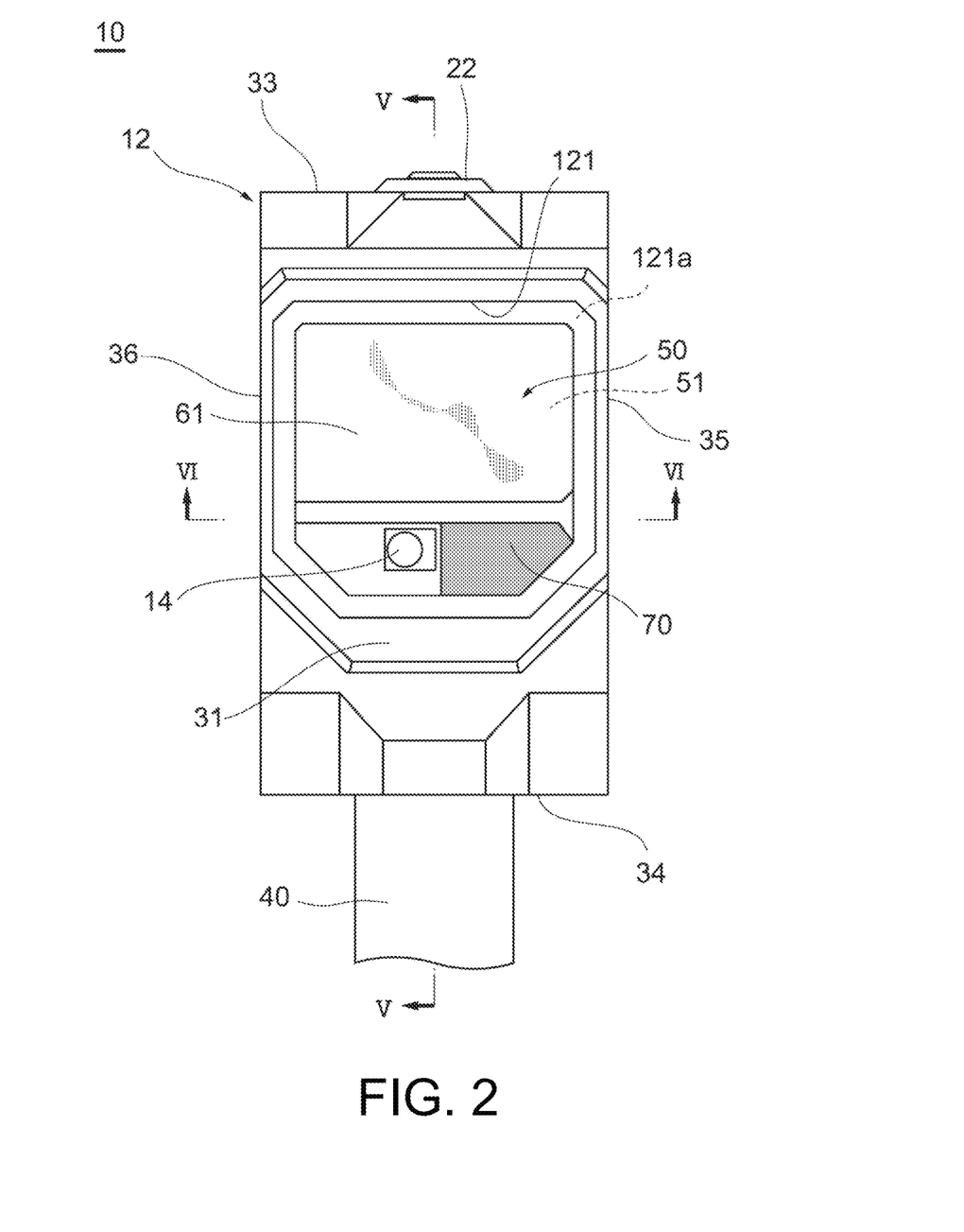
FIG. 2 is a front view of the photoelectric sensor shown in FIG. 1 as viewed from the front side.
Figure 3A:
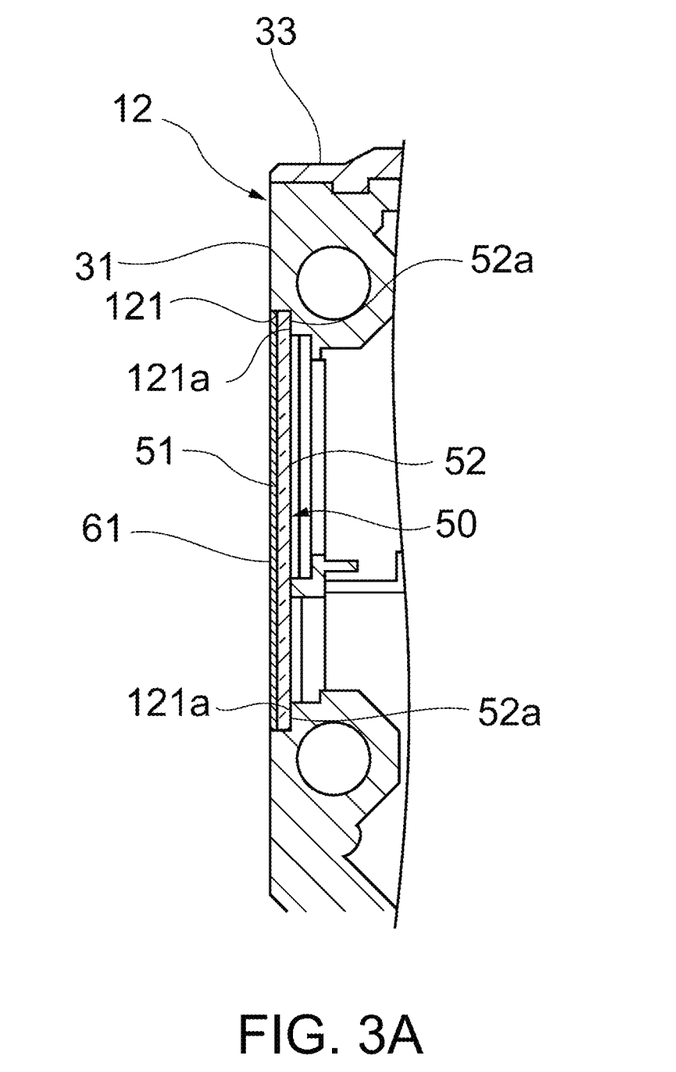
FIG. 3A is a cross-sectional view taken along the line V-V of FIG. 2.
Figure 3B:
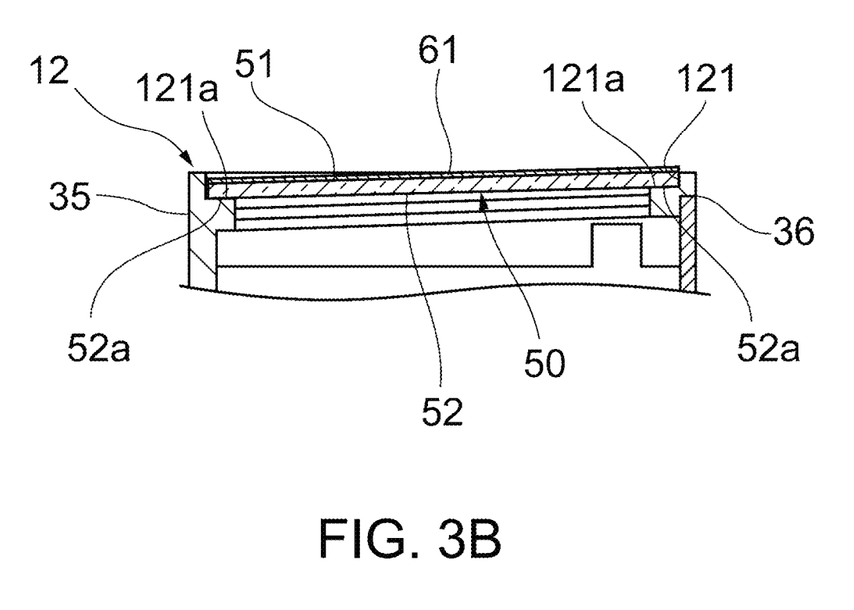
FIG. 3B is a cross-sectional view taken along the line VI-VI of FIG. 2.

The configuration of the cover lens 50 will be further described. FIG. 2 is a front view of the photoelectric sensor 10 shown in FIG. 1 as viewed from the front side. FIG. 3A is a cross-sectional view taken along the line V-V of FIG. 2. FIG. 3B is a cross-sectional view taken along the line VI-VI of FIG. 2.

In the present embodiment, the outer surface 51 (surface on the front side) of the cover lens 50 is applied with antifouling coating 61. For example, a material containing a fluorine-based compound is used as the antifouling coating 61. The material used for the antifouling coating 61 is not limited to this example, and for example, a material containing at least one of a silicon-based compound, a silica-based compound, and a titanium oxide-based compound is used. Further, these antifouling coating materials are chemically crosslinked with the base material to form a one-layer structure (one-layer coating structure). The one-layer coating structure and a two-layer coating structure will be described hereinafter.

Figure 7A:
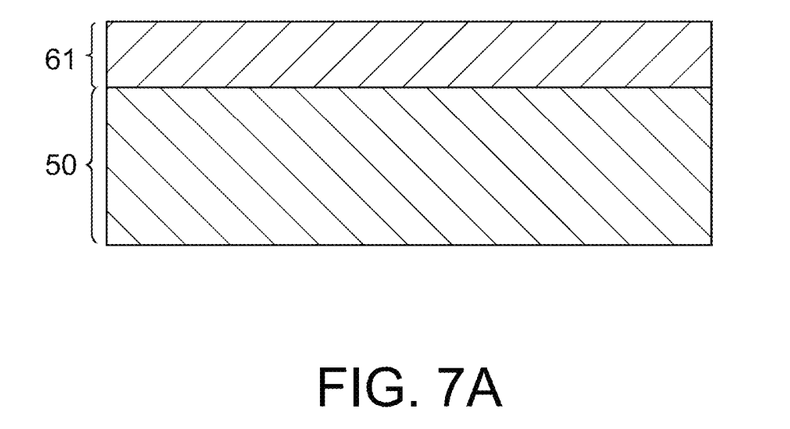
FIG. 7A is an explanatory view showing the one-layer coating structure.
Figure 7B:
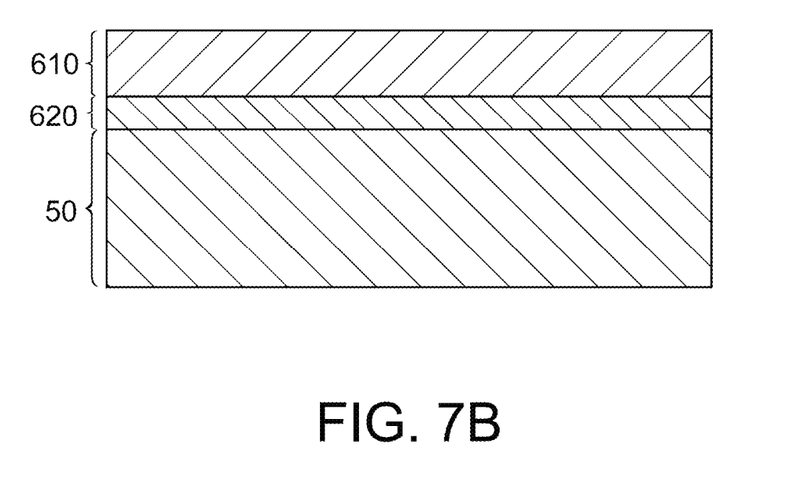
FIG. 7B is an explanatory view showing the two-layer coating structure.

FIG. 7A shows an example in which a coating agent formed on the surface of the cover lens 50 has the one-layer coating structure, and FIG. 7B is an example in which the coating agent formed on the surface of the cover lens 50 has the two-layer coating structure.

When the coating agent is formed on the cover lens 50, the usual coating agent has a two-layer coating structure (coating agent 610 and coating base material 620) as shown in FIG. 7B, but in this case, there are problems such as occurrence of an interference phenomenon, characteristic instability, and production variation. The problems that occur in the case of the two-layer coating structure will be described with reference to FIG. 5 and FIG. 6.

Figure 5:
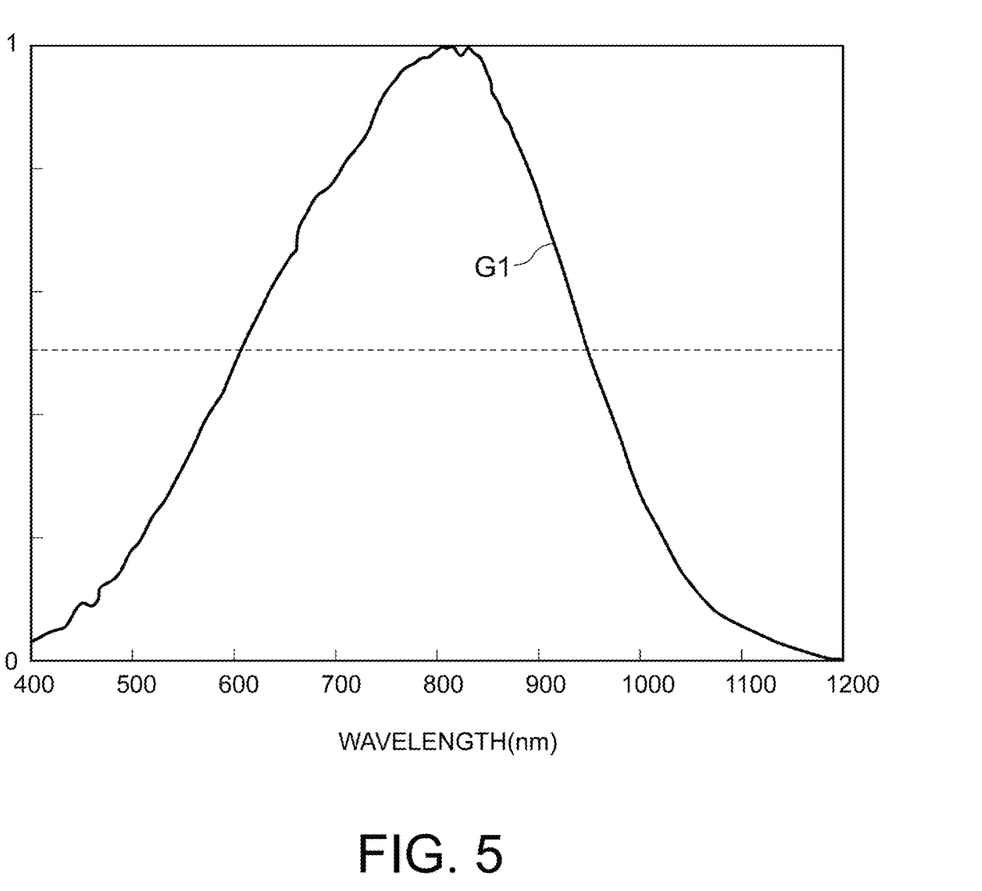
FIG. 5 is a diagram showing an example of the spectral sensitivity characteristic of the light receiving element.
Figure 6:
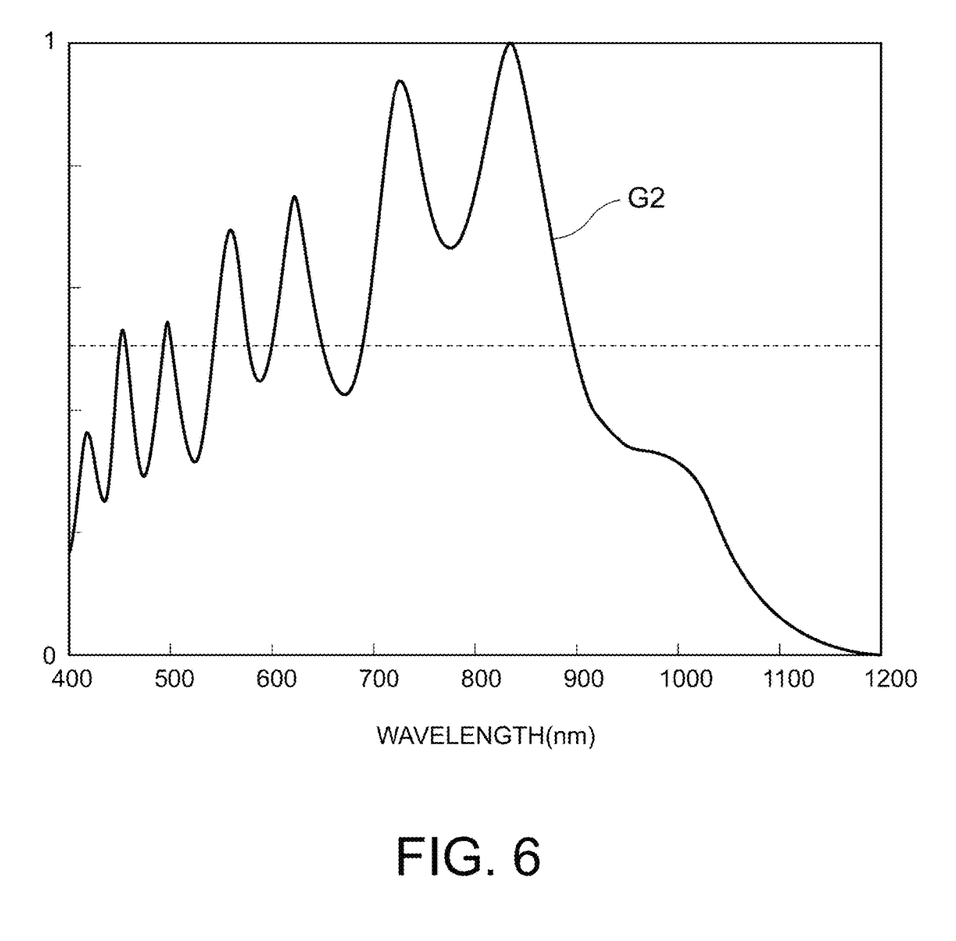
FIG. 6 is a diagram showing another example of the spectral sensitivity characteristic of the light receiving element.

FIG. 5 shows the spectral sensitivity characteristic (graph G1) when an optical thin film layer having a one-layer coating is present in the light receiving path from the cover lens 50 to the light receiving element. FIG. 6 shows the spectral sensitivity characteristic (graph G2) of the light receiving unit 16 (light receiving element) of the photoelectric sensor 10 in the case of a two-layer coating (adjacent two-layer coating structure of 1945 nm thick $SiO_2$ coating (refractive index 1.46) and 800 nm thick $Si_3N_4$ coating (refractive index 2.05)) in the path from the cover lens 50 to the light receiving element. The horizontal axis of FIG. 5 and FIG. 6 indicates the wavelength of light, and the vertical axis indicates the spectral sensitivity. As shown in FIG. 5, it can be seen that the ultraviolet light and infrared light regions are substantially cut through the visible light region. As shown by the spectral sensitivity characteristic in the case of the two-layer coating structure of FIG. 6, it can be seen that the interference caused by the two-layer coating causes waviness in the spectral sensitivity characteristic, and a large increase or decrease in the light receiving sensitivity occurs with respect to a small change in wavelength. In the photoelectric sensor, a single wavelength red (about 660 nm) or infrared (about 950 nm) LED or LD is often used as the light source, and the spectral sensitivity characteristic with waviness as shown in FIG. 6 has a problem that a large sensitivity fluctuation occurs due to manufacturing variation and temperature change between individual photoelectric sensors. Even if the antifouling coating has a two-layer coating structure, the same problems such as occurrence of an interference phenomenon, characteristic instability, and production variation occur.

In order to solve the above problems, in the present embodiment, two layers of coating agents (the coating base material 620 and the coating agent 610 shown in FIG. 7B) are chemically crosslinked, and the one-layer coating agent 61 (FIG. 7A) forms the antifouling coating. By forming the antifouling coating with the one-layer coating agent 61, as described with reference to FIG. 5 and FIG. 6, as compared with the case of the two-layer coating agent, the spectral sensitivity characteristic of the cover lens 50 reduces the variation during wavelength fluctuation, and the slope of the fluctuation becomes stable. As a result, stable optical characteristics can be obtained even when fluctuation occurs due to temperature characteristics of the light source and the coating agent.

When the antifouling coating 61 is applied to the entire inner surface 52 of the cover lens 50, since the material constituting the antifouling coating 61 has a high melting point, it is difficult to join the cover lens 50 to the housing 12 by laser welding. Further, when the joining is performed with the antifouling coating 61 exposed on the housing joint surface, the joinability between the cover lens 50 and the housing 12 using an adhesive deteriorates as compared with a case where only the base material is used (without the antifouling coating).

Therefore, in the present embodiment, the antifouling coating 61 is not applied to at least a joint portion (hereinafter, also referred to as a back surface peripheral portion 52a of the cover lens 50), which is in contact with the edge portion 121a of the housing 12 that defines the opening 121, on the inner surface 52 (surface on the rear side) of the cover lens 50. Thus, when the cover lens 50 is joined to the housing 12, the back surface peripheral portion 52a of the cover lens 50 and the edge portion 121a of the housing 12 can be joined by laser welding or an adhesive.

In the present embodiment, it is sufficient that at least the back surface peripheral portion 52a is not applied with the antifouling coating 61, and the antifouling coating 61 may or may not be applied to the portion of the inner surface 52 of the cover lens 50 excluding the back surface peripheral portion 52a. In other words, when the cover lens 50 is jointed to the housing 12, the antifouling coating 61 may or may not be applied to the portion of the cover lens 50 excluding the portion in contact with the housing 12.

For the cover lens base material (cover lens body), the material thereof is not particularly limited, and for example, a material containing at least one of acrylic resin, polycarbonate resin, polyarylate resin, and glass is used.

The cover lens 50 is manufactured by the following processes. According to the processes, the antifouling coating can be efficiently manufactured on one surface of the base material.

(1) The coating agent is applied to the surface of the base material by a method such as curtain coating.

(2) The coating agent is cured by a drying and UV irradiation process. At this time, with UV irradiation, a fluorine layer is precipitated on the surface of the coating agent to form a layer of the antifouling coating 61.

(3) A mark 70 is printed on the back surface by a method such as silk screen printing.

(4) Each cover lens 50 is cut out by a method such as milling.

Then, the housing 12 and the cover lens 50 are assembled by the following processes to manufacture the photoelectric sensor 10.

(1) The manufactured cover lens 50 is arranged at a position to cover the opening 121 of the housing 12. At this time, the back surface peripheral portion 52a of the cover lens 50 and the edge portion 121a of the housing 12 are in contact with each other.

(2) The back surface peripheral portion 52a of the cover lens 50 and the edge portion 121a of the housing 12 are processed by laser welding or an adhesive is applied thereto and cured to join the cover lens 50 to the housing 12.

Figure 4:
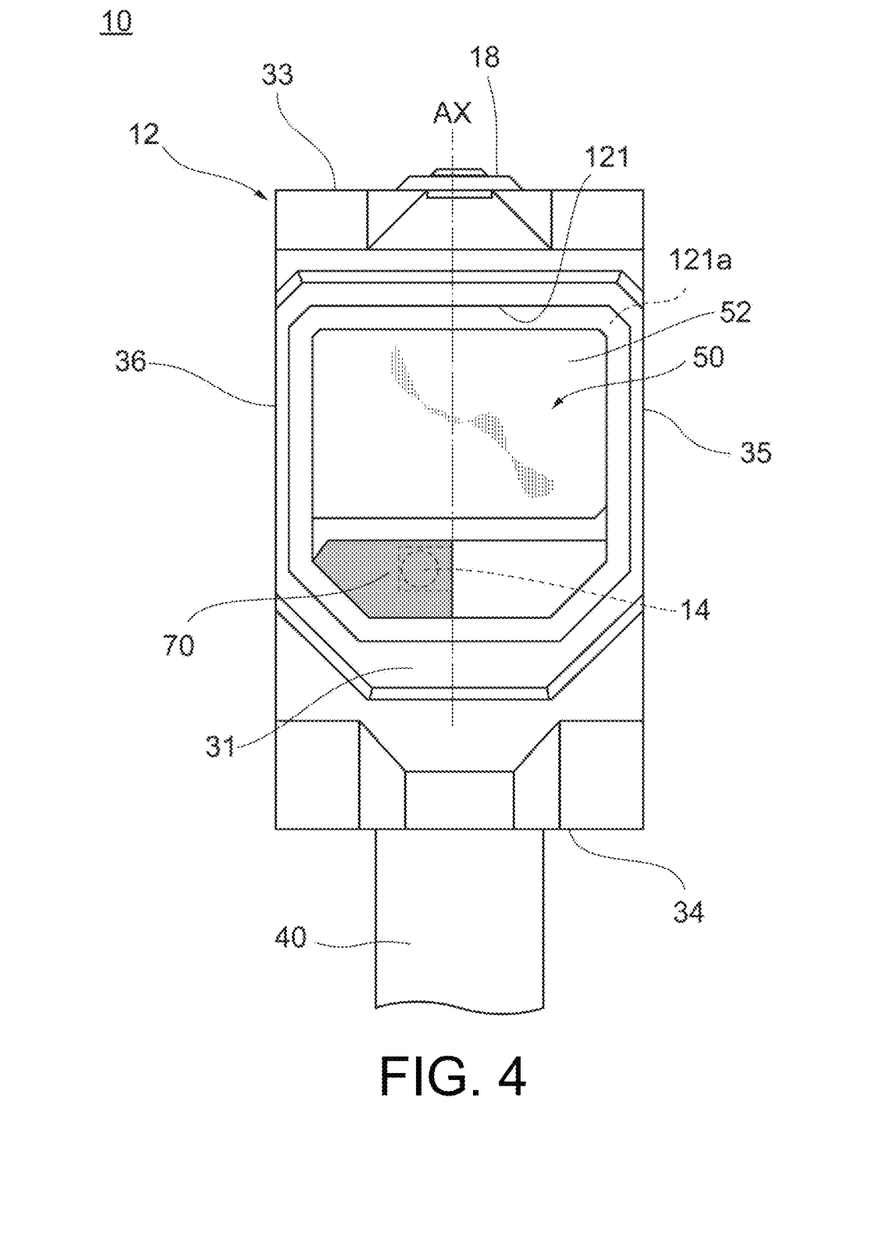
FIG. 4 is a view for illustrating a state where the cover lens is fitted into the opening inside out.

The mark 70 is printed on the inner surface 52 of the cover lens 50. When the cover lens 50 is fitted into the housing 12 inside out, the mark 70 is provided at a position that covers the light projecting unit 14 of the cover lens 50, as shown in FIG. 4. By printing the mark 70 on the cover lens 50 in this way, when fitting the cover lens 50 into the opening 121 of the housing 12 (that is, when joining the edge of the inner surface 52 of the cover lens 50 to the peripheral edge of the opening 121 of the housing 12), it is possible to determine whether the cover lens 50 is inside out, and it is possible to prevent the cover lens 50 from being accidentally arranged inside out in the housing 12.

The mark 70 printed on the inner surface 52 of the cover lens 50 is preferably provided at a position not crossing the central axis AX (the axis extending in the top-bottom direction through the center in the left-right direction of the cover lens 50) of the cover lens 50 shown in FIG. 4, for example. However, the cover lens 50 is not limited to such a position. As described above, the cover lens 50 may be provided at a position crossing the above-mentioned central axis AX if the mark 70 is at a position that covers the light projecting unit 14 when the cover lens 50 is fitted into the housing 12 inside out, and the position is not particularly limited. Further, as long as the mark 70 of the present embodiment provides the function of determining whether the cover lens 50 is fitted into the housing 12 inside out, the mark 70 is not necessarily printed on the inner surface 52, and various forms can be adopted.

Modified Example of the Embodiment

Figure 8:
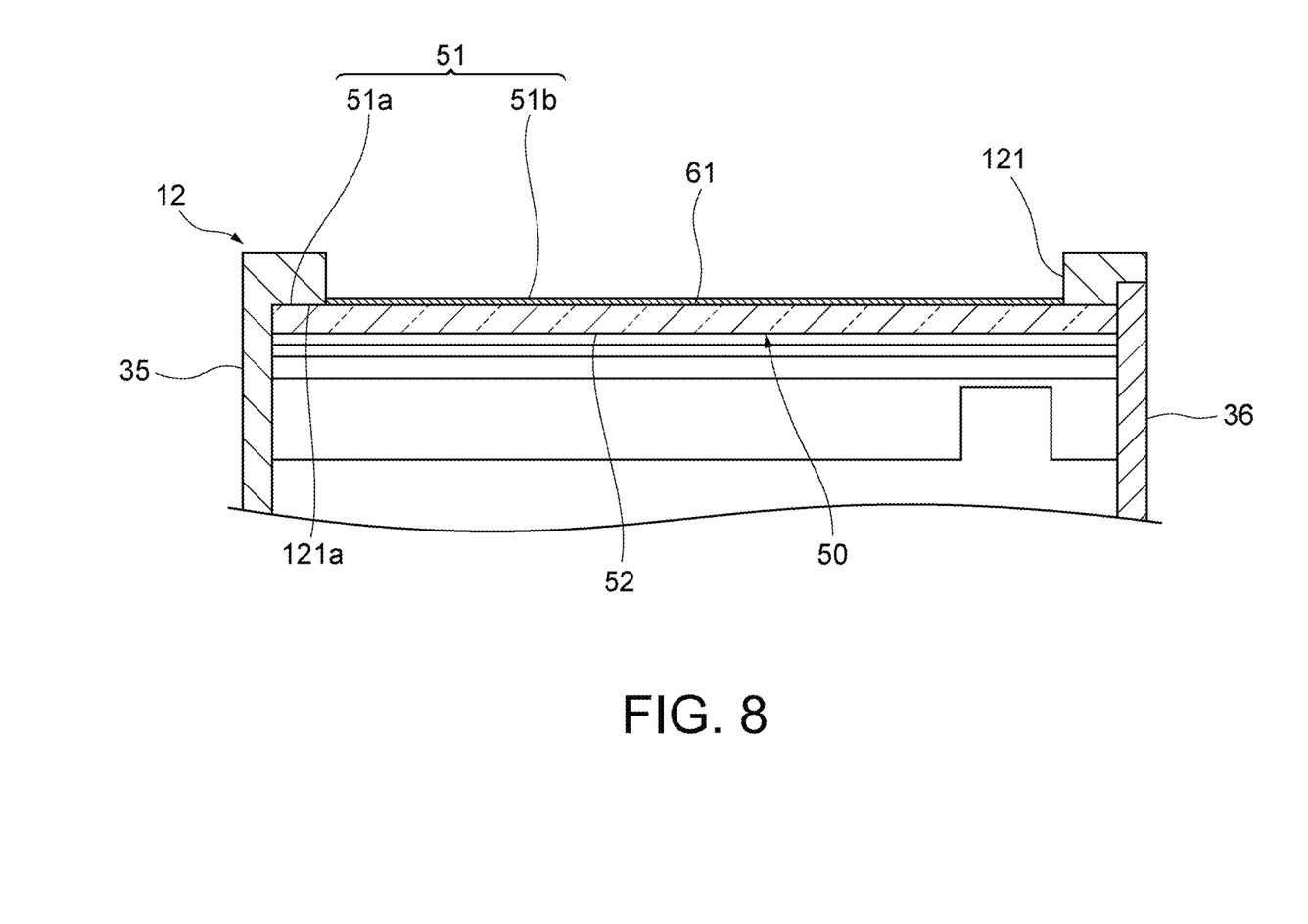
FIG. 8 is a cross-sectional view showing a modified example where the cover lens is fitted from the inner side.

In the embodiment described above, the cover lens 50 is fitted from the outside to the inside of the housing 12. However, as shown in FIG. 8, the cover lens 50 may be fitted from the inside to the outside of the housing 12. In this case, a region 51a in which the antifouling coating 61 is not applied may be formed on the outer surface 51 of the cover lens 12, and the cover lens 50 and the housing 12 may be joined by laser welding or an adhesive in the region 51a.

A region 51b to which the antifouling coating 61 is applied is formed to be as large as or slightly larger than the opening 121. Since the cover lens 50 is formed larger than the opening 121 of the housing 12, the region 51a to which the antifouling coating 61 is not applied is formed in a manner of surrounding the region 51b to which the antifouling coating 61 is applied. The region 51a is another example of the joint portion in contact with the edge portion 121a of the housing 12, similar to the back surface peripheral portion 52a described above.

The embodiments described above are provided to facilitate the understanding of the invention, and are not intended to interpret the invention in a limiting manner. Each element included in the embodiment and its arrangement, material, condition, shape, size, etc. are not limited to those exemplified, and can be changed as appropriate. In addition, the configurations shown in different embodiments can be partially replaced or combined.

APPENDIX

1. A photoelectric sensor 10 housing at least one of a light projecting unit 14 that emits light and a light receiving unit 16 that receives light in a housing 12, wherein the housing 12 has an opening 121 that allows at least one of light from the light projecting unit 14 and light to the light receiving unit 16 to pass through, a cover lens 50 that covers the opening 121 and transmits the light is provided, the cover lens 50 is joined to an edge portion 121a of the housing 12 that defines the opening 121, and an outer surface 51 of the cover lens 50 is applied with antifouling coating 61 while a portion, which is in contact with the edge portion 121a, of an inner surface 52 of the cover lens 50 is not applied with the antifouling coating 61.

DESCRIPTIONS OF REFERENCE NUMERALS

10 . . . photoelectric sensor, 12 . . . housing, 14 . . . light projecting unit, 16 . . . light receiving unit, 50 . . . cover lens, 61 . . . antifouling coating, 70 . . . mark, 121 . . . opening, 121*a* . . . edge portion

What is claimed is:

1. A photoelectric sensor housing at least one of a light projecting unit that emits light and a light receiving unit that receives light in a housing, wherein
   the housing has an opening that allows at least one of light from the light projecting unit and light to the light receiving unit to pass through,
   a cover lens that covers the opening and transmits the light is provided,
   the cover lens is joined to an edge portion of the housing that defines the opening, and
   an outer surface of the cover lens is applied with antifouling coating while a portion, which is in contact with the edge portion, of an inner surface of the cover lens is not applied with the antifouling coating,
   wherein a material constituting the antifouling coating is a structure comprising a coating base material and an antifouling material to form a one-layer structure in which the coating base material and the antifouling coating material are chemically crosslinked.

2. The photoelectric sensor according to claim 1, wherein the portion, which is in contact with the edge portion, of the inner surface of the cover lens and the housing are joined by laser welding.

3. The photoelectric sensor according to claim 2, wherein a mark indicating that the cover lens is arranged inside out in the housing is printed on either the inner surface or the outer surface of the cover lens.

4. The photoelectric sensor according to claim 2, wherein the material constituting the antifouling coating is one or more compounds selected from a group consisting of a fluorine-based compound, a silicon-based compound, a silica-based compound, and a titanium oxide-based compound.

5. The photoelectric sensor according to claim 1, wherein the portion, which is in contact with the edge portion, of the inner surface of the cover lens and the housing are joined by an adhesive.

6. The photoelectric sensor according to claim 5, wherein a mark indicating that the cover lens is arranged inside out in the housing is printed on either the inner surface or the outer surface of the cover lens.

7. The photoelectric sensor according to claim 5, wherein the material constituting the antifouling coating is one or more compounds selected from a group consisting of a fluorine-based compound, a silicon-based compound, a silica-based compound, and a titanium oxide-based compound.

8. The photoelectric sensor according to claim 1, wherein a mark indicating that the cover lens is arranged inside out in the housing is printed on either the inner surface or the outer surface of the cover lens.

9. The photoelectric sensor according to claim 8, wherein the mark is provided at a position covering the light projecting unit of the cover lens when the cover lens is arranged inside out in the housing.

10. The photoelectric sensor according to claim 9, wherein the material constituting the antifouling coating is one or more compounds selected from a group consisting of a fluorine-based compound, a silicon-based compound, a silica-based compound, and a titanium oxide-based compound.

11. The photoelectric sensor according to claim 8, wherein the material constituting the antifouling coating is one or more compounds selected from a group consisting of a fluorine-based compound, a silicon-based compound, a silica-based compound, and a titanium oxide-based compound.

12. The photoelectric sensor according to claim 1, wherein the material constituting the antifouling coating is one or more compounds selected from a group consisting of a fluorine-based compound, a silicon-based compound, a silica-based compound, and a titanium oxide-based compound.

13. A photoelectric sensor housing at least one of a light projecting unit that emits light and a light receiving unit that receives light in a housing, wherein
    the housing has an opening that allows at least one of light from the light projecting unit and light to the light receiving unit to pass through,
    a cover lens that covers the opening and transmits the light is provided,
    the cover lens is joined to an edge portion of the housing that defines the opening, and
    a part of an outer surface of the cover lens is applied with antifouling coating while another part of the outer surface of the cover lens is in contact with the edge portion and is not applied with the antifouling coating,
    wherein a material constituting the antifouling coating is a structure comprising a coating base material and an antifouling material to form a one-layer structure in which the coating base material and the antifouling coating material are chemically crosslinked.

14. A method for manufacturing a photoelectric sensor in which an opening provided in a housing is covered with a cover lens to allow at least one of light emitted from a light projecting unit and light received by a light receiving unit from outside to pass through, the light projecting unit and the light receiving unit being housed in the housing, the method comprising:
    a step of applying antifouling coating to an outer surface and an inner surface of the cover lens;
    a step of creating a region to which the antifouling coating is not applied in a portion of the cover lens;
    a step of arranging the cover lens in a manner of covering the opening; and
    a step of joining the cover lens and the housing in the region of the cover lens to which the antifouling coating is not applied,
    wherein a material constituting the antifouling coating is a structure comprising a coating base material and an antifouling material to form a one-layer structure in which the coating base material and the antifouling coating material are chemically crosslinked.

\* \* \* \* \*